Patented July 16, 1940

2,208,138

UNITED STATES PATENT OFFICE 2,208,138

PROCESS FOR RECOVERING TIN AND STEEL FROM TIN PLATE

Roger T. Robinson, Huntington Park, Calif.

No Drawing. Application February 27, 1937, Serial No. 128,232

7 Claims. (Cl. 75—98)

This invention relates to the recovery of tin and steel from tin plate, for example, treatment of tin cans, and has for its general object to provide a commercially practical process for recovering tin from tin plate while at the same time recovering steel of the plate in a valuable form.

Heretofore, various processes have been proposed for the recovery of tin from tin plate, but, as far as known, such processes have not been placed into practical use, or they are usable only upon new tin plate, or scrap, or tin plate which has been cleaned to substantially the same extent as the new plate, or they have failed due to their attack on the iron as well as the tin of the plate.

It is the general object of the present invention to provide a process of treating tin plate which may be applied commercially to both new plate and used plate, and which will efficiently and economically separate tin from the steel plate recovering each separately in a commercially valuable form.

Generally speaking, the process of the present invention depends upon contacting the tin plate with the solution of tin and iron salts in the acid state for the purpose of dissolving the tin from the scrap. Following this step of dissolving the tin from the scrap, the solution is then electrolyzed to recover tin from the solution and to regenerate the tin solvent, and the solution recirculated into contact with the scrap. In such a process it is preferable that the solution and the tin plate be treated in a counter-current manner and with an agitation or tumbling motion of the scrap with reference to the solution during treatment. Such process should also include steps for recovery of the tin in the solution adhering to the plate after it leaves the treater. The process should also include suitable steps for controlling the concentration of materials of the solution and the impurities in the solution during the process.

Generally speaking, the recovery of tin and steel from tin scrap by contacting the same with acid solution of iron and tin salts has been previously suggested, but not used commercially; the commercial recovery of tin from scrap having been carried out with alkaline solutions, or by processes using chlorine. Such methods require the tin plate to be in a clean condition. The previously suggested acid solutions for the process have all had one of two difficulties. They have been either so composed as to have but a slow rate of solution of tin from the plate and are, therefore, not commercially desirable, or they have had a rapid rate of solution of tin, but likewise a comparatively rapid rate of attack of the iron or steel of the plate, with the result that the desired separation of the tin and iron of the plate into separately collectable and valuable products has not been attained.

In the case of the present invention, the process is carried out by a solution which as it enters the treater consists of tin and iron chlorides with the impurities unavoidably introduced in the process. It appears important to the process of the present invention that chloride salts be present, as solutions containing only sulphate salts do not have the desirable properties of the solution of the present invention. An increase in concentration of the acid in solution increases the rate of solution of tin but decreases the ratio of tin to iron dissolved. High acid concentrations are destructive to any iron equipment used. Generally, it is found in iron equipment that solutions having an acidity of from about one-half to four molal are preferred.

The oxidation condition of the tin and iron chlorides of the solution entering the treater is an important factor to the success of the process of the present invention. In order to secure a rapid rate of solution of tin from the tin plate, while at the same time avoiding a rapid attack on the iron of the tin plate, the oxidation condition of the solution entering the treater should be that which nearly corresponds to the oxidation condition of an equivalent solution equal in tin and iron concentrations and formed by dissolving stannic chloride and ferrous chloride. A somewhat lower state of oxidation than this value may be used but has the effect of reducing the rate of solution of tin during the process. A higher degree of oxidation than this condition is to be avoided because solutions of that character have the property of attacking iron at an undesirable rate.

As solutions containing both iron and tin chlorides are progressively oxidized, they generally change in color from blue to green, and in turn to yellow or brown. Usually the presence of the green color is an indication that the desired oxidation condition has been reached. In general, the solution should not be oxidized to the appearance of the yellow color, as this generally corresponds to an over-oxidized condition. There are cases, however, particularly where the solution is highly acid, where the oxidation condition even at the appearance of the yellow color may still be such as to fit the solution for the process. The color changes through which the solution may pass are, however, a useful guide to the operator. In place of using the color change, the operator may employ some measure of the oxidation reduction potential as a guide for determining the proper state of oxidation for the solutions in the process.

One explanation for the foregoing oxidation requirements of the solution entering the treater which we believe may be correct is as follows: The equilibrium constant for the reaction between ferrous chloride and stannic chloride to form stannous chloride and ferric chloride is sufficiently small so that one may avoid the presence of any material amount of ferric chloride in the solution until the oxidation condition of the solution is greater than that which will correspond to all of the iron being in the ferrous state and all of the tin in the stannic state. The presence of ferric chloride in the solution in a material quantity is known to have the effect of rapidly attacking the iron so as to render the solution unfit for the process of the invention.

With the foregoing explanation the process of recovering tin and steel from tin plate from the present invention will best be understood from a description of a preferred process embodying the invention and a comparison of it with examples of the use of different solutions to show the effect of departing from the preferred conditions of operation.

In the preferred process the solution is contacted in a counter-current manner with the tin plate to be treated, preferably by causing the solution to flow through a rotary treating drum in the direction opposite to which the tin plate is introduced, and removing the tin plate from one end of the treater substantially continuously while it is introduced continuously into the other end of the treater. In this manner the tin plate is given a tumbling agitating motion with reference to the solution, which facilitates proper contact and rapid solution of tin in operation.

The solution entering the treater is preferably an aqueous solution containing stannic chloride, hydrochloric acid, ferrous chloride, together with other unavoidably introduced or accumulated impurities. The solution may contain some stannous chloride, but that should be maintained at a minimum in order to secure a rapid treating rate. Ferric chloride, on the other hand, should be maintained as low in concentration as possible, that is, the oxidation of the solution should not go beyond the stage necessary to convert substantially all of the tin salts to the stannic form. The solution of the present invention dissolves the metallic tin from the tin plate at a rate of from 10 to 45 times as fast as it does the iron from steel plate. At least a twenty-fold difference is commonly to be expected of this solution. In comparison, solutions of similar acid concentration, in which the iron of the solution is substantially all in the ferric state dissolve metallic tin only about two to three times as fast as they dissolve metallic iron. The concentration of stannic chloride in the entering solution may vary over a considerable range, but solutions as low as 0.06 molal with respect to stannic chloride have given great enough rates of reaction for commercial detinning operations, and it is possible that even lower concentrations may be used. Solutions containing stannic chloride as high as 0.27 molal in concentration have been used satisfactorily and somewhat higher concentrations may be used, if desired. However, for commercial operations it is desirable to keep the concentration of tin salts in the solution reasonably low for the reason that the steel of the scrap as it leaves the treater carries along with it a portion of the treating solution. For this reason, a high concentration of tin in the solution increases the amount of tin which must be recovered from the liquors resulting from the washing of the treated plate. In general, it is believed that commercial operations should take place with tin salt concentrations of less than 0.27 molal.

The higher the concentration of the stannic chloride, the more rapid the solution of the tin from the scrap, but the improvement in this respect does not necessarily outweigh the disadvantage of the necessity of recovering the solution from the treated plate. However, the concentration of tin salts to be used commercially is subject to variation at the will of the operator. But, aside from such matters of economic balance the concentration of tin salts in the solution may be varied without changing the character of the reaction, utilizing concentrations higher than 0.27 molal or lower than 0.06 molal, if desired.

Substantially all of the tin present in the solution as it enters the treater should be in the stannic form; that is, the concentration of stannous tin should be as low as operating control will permit. The presence of stannous tin decreases the rate at which the stannic chloride in the solution will dissolve the metallic tin. This rate decreases rapidly with increased concentration of stannous tin even when the concentration of the stannic tin is held constant. For example, when an iron free solution 0.13 molal in stannic chloride having a pH of −0.27 is increased in stannous chloride concentration from 0 to 0.25 molal, the tin solution rate decreases by about one-half and the iron solution rate to about one-quarter of its former value. When ferrous chloride is present, the change is somewhat different. Using a solution 0.26 molal in stannic chloride, 0.27 molal in ferrous chloride, and having a pH of −0.27, a change of stannous chloride concentration from 0 to 0.26 molal decreases the tin solution rate to about one-fifth of its former value, but the iron solution rate is only decreased by little more than one-half.

Ferrous chloride will be present in the solution entering the treater since the solution when treating tin plate must unavoidably come into contact with metallic iron. The importance of ferrous chloride concentration lies in the fact that the rate of solution of iron increases rapidly with an increase of chloride ion concentration. As an example of this fact, when a solution 0.06 molal in stannic chloride, 0.27 molal in ferrous chloride, and having a pH of −0.27 is increased in sodium chloride concentration from 0 to 1 molal, the rate of solution of metallic tin is increased by about 8%, but the rate of solution of metallic iron is increased by approximately 100%. For this reason, it is desirable to keep the concentration of chloride ion as low as possible. Furthermore, when a solution 0.26 molal in stannic chloride and having a pH of −0.27 is increased in ferrous chloride concentration from 0 to 0.46 molal, the rate of solution of metallic tin is decreased by about 20%, but the rate of solution of metallic iron is increased by approximately 100%. For this reason it is desirable to keep the concentration of ferrous chloride low. Therefore, as the concentration of ferrous chloride tends to increase in accordance with the process of the present invention, a portion of the solution is withdrawn from the cycle and replaced with similar volumes of liquid low in iron concentration; this being done at such a rate as to maintain the iron concentration at a desirable figure. The withdrawn solution may be suitably treated in any desired fashion to recover the tin from the solution or to precipitate the iron, in which latter case it may be returned to the cycle. But, I have preferably treated the solution by passing the same to a clean-up cell, wherein it has been subjected to sufficient electrolysis to remove substantially all of the tin, after which the solution has been discarded from the process.

While it is desirable to keep the concentration of iron salts in the solution as low as possible, the exact maximum of iron salts to be maintained in the cycle is a matter of economic balance, and satisfactory results have been secured in practice with concentrations as great as 0.5 molal with respect to iron salts. The concentration of iron salts is not nearly as critical as the oxidation condition of the salts. If the solution is oxidized to a point where any material ferric chloride concentration appears, the solution then rapidly attacks iron, thereby not only interfering with the recovery of the steel of the plate, but also attacking the pumps, pipes and steel linings of the apparatus. For example, a solution 0.3 molal in ferric chloride having a pH of −0.27 will eat through a one-half inch steel plate in about 240 hours at 86° F.

Hydrochloric acid should be present in the solution. Generally, I prefer to maintain the hydrochloric acid concentration between the limits of one-half and four molal, although higher and lower concentrations may be used. However, the rates at which both tin and iron pass into solution increase in approximately direct proportion to the hydrogen ion concentration of the solution. Consequently, an increase of acid concentration will in effect increase the capacity of the treating apparatus. Also, acid is a necessary constituent, since if the hydrogen ion concentration falls too low both tin and iron chloride react to form insoluble precipitates. The following data are given to show the effect of changing the acidity of the treating solution. A solution 0.26 molal in stannic chloride and 0.27 molal in ferrous chloride when increased in the concentration of hydrogen ions from 0.47 molal to 1.8 molal, as determined by pH measurements, increased in rate of tin solution by over four-fold, and when increased from 0.47 molal to 6 molal (in this last value, this is concentration of added acid) increased in rate of tin solution by about ten-fold. The rate of solution of iron increased in the first case by over three-fold and in the last case by about thirty-five-fold. In the first-mentioned group of solutions no hydrogen gas was produced, but in the case of the last solution hydrogen bubbles were rapidly evolved. I have found it most satisfactory to use concentrations of one and a half to two molal. However, as explained above, this concentration may be varied.

The passage of the solution through the treating zone should be regulated to such a rate that the stannic chloride of the entering treating solution is converted as far as feasible to the stannous form by the time the solution is removed from the treater. Passage of the tin plate through the treater should be so regulated that the plate leaving the treater has been substantially denuded of tin, although it is to be understood that it ordinarily will not be possible to completely de-tin the plate in the treater, particularly with respect to that tin maintained within unbroken seams of the cans.

The temperature of the treating solution in the operation of dissolving the tin does not appear to be particularly critical. Temperatures of around 70–90° F. have been used and found satisfactory. This temperature range has been used because it corresponds to common room temperature and for that reason is convenient to maintain.

After the solution is taken from the treater, it is passed to an electrolytic cell. For example, it may be passed to an electrolytic cell of the form shown in the copending application of William N. Lacey, Serial No. 58,819, filed January 13, 1936, or any other usual or preferred form of cell for such purposes. Within the electrolytic cell the solution is subjected to electrolysis wherein the stannous chloride present in the solution, as it left the treater, is substantially completely converted to the stannic chloride form with the simultaneous recovery of metallic tin; and inasmuch as the efficiency of the solution entering the treater is dependent upon having its tin content mostly in the stannic form and its iron content mostly in the ferrous form, the electrolytic action in the cell must be accurately controlled to secure this condition. In the cell it is of value to have ferrous chloride present in solution, since it makes it possible to secure substantially complete oxidation of the tin to the form of stannic chloride and still maintain high anode efficiency. If, for any reason, the solution is kept too long in the cell and over-oxidized, some of the ferrous chloride will be changed to the ferric state. In this case the solution could then be mixed in a blending or storage tank with a proper amount of solution as it comes from the treater to convert all the ferric iron to ferrous iron and all of the stannous tin in the treater liquid to the stannic form before the solution is permitted to enter the treater.

The electrolytic cell should have an insoluble anode so that the anode reactions will oxidize the solution. A cell current density of 10 amperes per square foot was found to be satisfactory, as was a cell temperature of 80–90° F. After the solution has been treated in the cell so that substantially all of the tin is in the stannic form, the liquor is returned to the treater for re-use; unless the solution has been over-oxidized and in that case the blending process is used to reduce the oxidation condition in the solution before its re-use.

In the operation of this process iron is slowly but continuously dissolved by the treating liquor. This has a reducing action upon the solution and tends to lower the concentration of stannic chloride therein. Since the oxidizing action in the electrolytic cell does not counterbalance this reduction, the concentration of stannic chloride in the solution leaving the electrolytic cell will tend to decrease gradually upon continued operation. However, since the solution is exposed to the air in the treater and other open apparatus, there is an oxidizing action that tends to correct this drift. The problem then becomes one of control, and since the net drift may be in either direction, depending on the construction and operation of the apparatus, correction of any tendency to drift in either direction should be understood.

To oxidize the solution in case it is needed, numerous methods are possible. For example, stannic chloride can be added to the solution, or oxygen or chlorine gas can be made to dissolve in the liquor and react with the reduced forms of iron or tin that are present. To reduce the solution in case the concentration of stannic tin tends to rise, I dilute the liquor and run the excess through the clean-up cell.

While the particular form of process herein described is well adapted to carry out objects of the present invention, it will be understood that the process is capable of numerous modifications and the invention includes all such modifications and changes as come within the scope of the appended claims.

I claim:

1. A process of leaching tin plate to dissolve the tin and leave the steel of the plate substantially undissolved, which process comprises contacting the tin plate with a treating solution, the fresh treating solution containing free hydrochloric acid, tin chloride mainly in the stannic state and iron chloride substantially all in the ferrous state, the oxidation of the solution not being beyond the stage necessary to convert all of the tin salts to the stannic form, the contact of the solution and tin plate being regulated to substantially denude the plate of tin while substantially reducing the stannic chloride of the solution to stannous chloride.

2. A process of leaching tin plate to dissolve the tin and leave the steel substantially undissolved, which comprises continuously contacting a solution and the tin plate in a counter-current manner so as to substantially denude the plate of tin in its passage through the treating step, controlling the composition of the solution entering the treating step so that it contains hydrochloric acid, stannic chloride and ferrous chloride and is substantially free of ferric chloride, the oxidation of the solution not being beyond the stage necessary to convert all of the tin salts to the stannic form, the concentration of hydrochloric acid in the solution being sufficiently low to avoid perceptible evolution of hydrogen gas in the treating step, and the period of contact of the solution with the tin plate in the treating step being such as to substantially reduce the stannic chloride of the solution to the form of stannous chloride.

3. A process of treating tin plate for the recovery of the tin and steel thereof, which comprises contacting the plate with an aqueous solution containing hydrochloric acid in insufficient quantities to effect hydrogen evolution during contact with the plate but sufficiently high in concentration to prevent the formation of insoluble precipitates of tin and iron compounds, the solution being sufficiently free of other acids so as to be effective in dissolving tin at a rate at least ten times as fast as it does iron, the solution containing tin chloride nearly all in the stannic state and iron chloride below about 0.5 molal in concentration and substantially completely in the ferrous state, the oxidation of the solution not being beyond the stage necessary to convert all of the tin salts to the stannic form.

4. A process of treating tin plate for the recovery of the tin and steel thereof, which comprises contacting the plate with an aqueous solution containing hydrochloric acid in insufficient quantities to effect hydrogen evolution during contact with the plate but sufficiently high in concentration to prevent the formation of insoluble precipitates of tin and iron compounds, the solution being sufficiently free of other acids so as to be effective in dissolving tin at a rate at least ten times as fast as it does iron, the solution containing tin chloride nearly all in the stannic state and iron chloride substantially completely in the ferrous state, the oxidation of the solution not being beyond the stage necessary to convert all of the tin salts to the stannic form, the concentration of stannic chloride in the entering solution being below about 0.26 molal and the concentration of ferrous chloride being below about 0.5 molal.

5. A process of treating tin plate for removal of tin and recovery of steel, which comprises contacting the plate in a counter-current manner with a solution approximately 0.06 molal in stannic chloride and approximately 0.27 molal in ferrous chloride, the oxidation of the solution not being beyond the stage necessary to convert all of the tin salts to the stannic form, with sufficient free hydrochloric acid to produce a pH of —0.27.

6. A solution for recovering tin from tin plate, such solution comprising an aqueous solution of hydrochloric acid not substantially less than 0.47 molal or not substantially greater than 3 molal, as measured by pH determination, the solution containing tin chloride substantially completely in the stannic state, iron chloride substantially completely in the ferrous state, the oxidation of the solution not being beyond the stage necessary to convert all of the tin salts to the stannic form, concentration of stannic chloride being not substantially greater than 0.26 molal and concentration of ferrous chloride being not substantially greater than 0.5 molal.

7. A process of leaching tin plate to dissolve the tin without substantial attack upon the steel, which process includes contacting the tin plate with the treating solution containing tin salts substantially completely in the stannic state and iron salts substantially completely in the ferrous state, an excess of hydrochloric acid, the treating solution containing concentrations of stannic chloride, ferrous chloride and hydrochloric acid so that it possesses a rate of attack upon tin of at least ten times its rate of attack on iron, the contact of the solution with the tin plate being regulated to substantially denude the plate of tin while substantially reducing the stannic chloride of the solution to stannous chloride.

ROGER T. ROBINSON.